Nov. 4, 1924.  
G. LANE ET AL  
1,514,543  
STEREOSCOPIC PROJECTION  
Filed July 24, 1922  
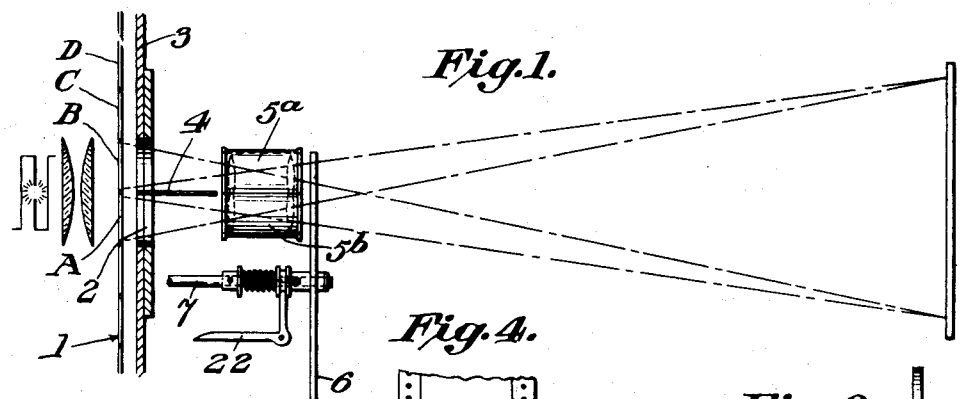
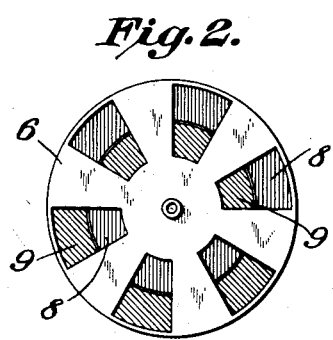
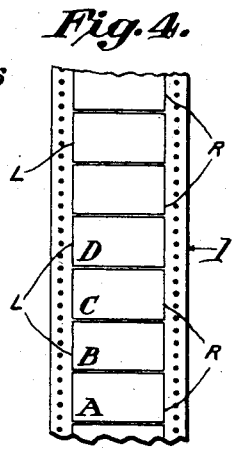
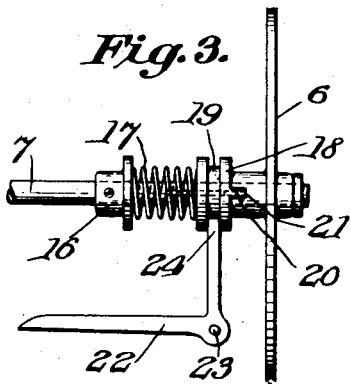
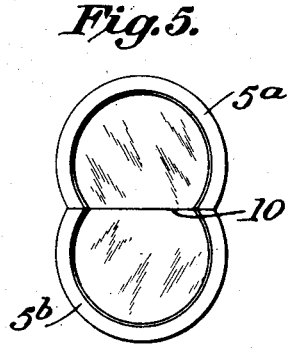
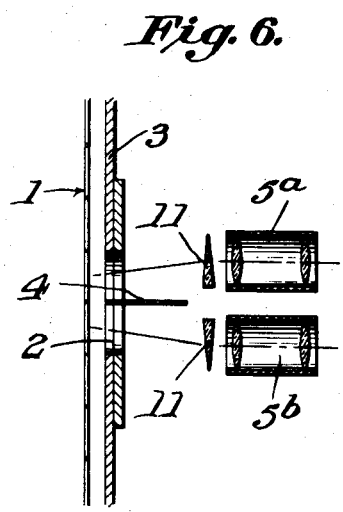
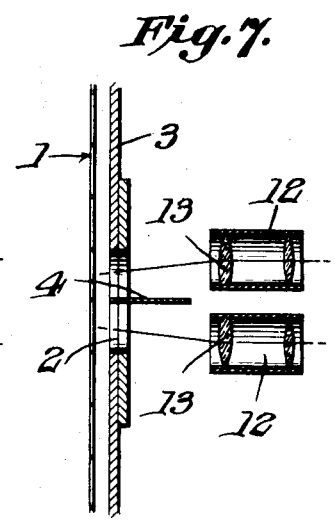
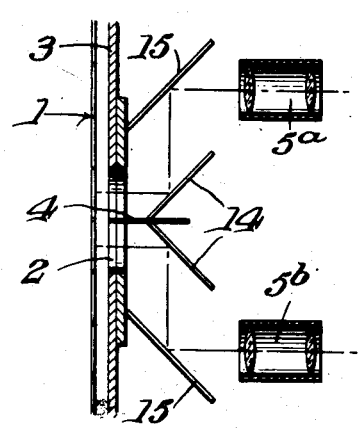
Inventors:  
George Lane, and  
John E. Patterson,  
by Spear, Middleton, Donaldson & Hall  
Attys.

Patented Nov. 4, 1924.

1,514,543

UNITED STATES PATENT OFFICE.

GEORGE LANE AND JOHN E. PATTERSON, OF POUGHKEEPSIE, NEW YORK.

STEREOSCOPIC PROJECTION.

Application filed July 24, 1922. Serial No. 577,189.

*To all whom it may concern:*

Be it known that we, GEORGE LANE and JOHN E. PATTERSON, citizens of the United States, and residents of Poughkeepsie, in the county of Dutchess and State of New York, have invented certain new and useful Improvements in Stereoscopic Projections, of which the following is a specification.

Our present invention relates to the projection of moving pictures in order to produce an apparent third dimension to the eye, or, in other words, a stereoscopic effect.

The principal object of our invention is the utilization of a single film strip upon which are printed what we term "right" and "left" pictures.

Another object is the isolation of right and left pictures from the field of vision, as may be found desirable, with the use of color filters.

Still another object is the simultaneous projection of two pictures upon the screen, the two pictures being superimposed.

The preparation of the film strip for use in this invention may be accomplished in any desired manner, with which we are not concerned, as long as two stereoscopic pictures are produced upon a single film strip, the right and left hand views being alternated in regular sequence.

To this end the invention consists in a projection apparatus which is provided with a double film gate through which two pictures are projected simultaneously, each through its own lens. A suitable color filter intercepts the light from each picture, the said pictures being superimposed upon the same screen area.

Our invention further consists in the novel arrangement, construction and combination of parts more fully hereinafter described.

We have illustrated one embodiment of our invention in the accompanying drawings, which is merely in the manner of explaining more fully the principle upon which this invention is based and is not to be taken in a limiting sense.

In these diagrammatic drawings:

Fig. 1 is a diagrammatic side elevation of one form of device.

Fig. 2 is a view of a filter shutter.

Fig. 3 is a view of the filter shutter mechanism.

Fig. 4 is a view of a piece of film.

Figs. 5, 6, 7, and 8 show various arrangements of lenses.

Referring now more particularly to these drawings, we have illustrated a film strip at 1 having thereon alternately arranged right and left hand pictures, being designated as R and L respectively. The ordinary mechanism for feeding the pictures one at a time is provided. A film gate 2 is provided in the aperture plate 3 of an area sufficient to allow two adjacent pictures to be projected therethrough. A division plate 4 at substantially 90° to the plane of the aperture plate 3 is provided to prevent interference of the light from each picture before reaching the lens. Lenses 5ª and 5ᵇ are provided, through which the upper and lower pictures passing in front of the film gate are projected respectively. A shutter 6 revolubly connected to the feeding mechanism is provided in the usal manner, being mounted upon a shaft 7. The shutter is provided with cut away portions within which are placed color filters 8 and 9 of opposite color values, such as red and green. These filters are arranged at top and bottom of the shutter in a reverse manner, so that as the light is projected through the lenses 5ª and 5ᵇ the red filter will be uppermost in one-half the revolution of the shutter, the green filter occupying this position during the other half of the shutter revolution. The intermediate opaque portions of the shutter 6 intermittently cut off both pictures from the screen, as in the usual construction.

The operation of the device is as follows:

The film strip is advanced one picture at a time as in the usual manner of standard machines. As adjacent right and left pictures are presented to the light through the film gate, the red portion of the color filter being uppermost, picture A will be shown through the green filter, while picture B will pass through the red filter, both pictures being superimposed upon the same screen area. Upon farther rotation of the shutter both pictures will be cut off from view, during which time the picture B will advance to the former position of picture A, and new picture C will take the place of picture B. Thus pictures B and C will be projected simultaneously. At this point the color filter in rotating has reversed its position, namely, the filter 9 or the color green is now uppermost, thus causing the picture C to be shown through the green filter, the picture B still being projected through the red filter, as before. Upon a repetition of this cycle the picture C will move into B's position, and as the filter reverses itself upon rotation will still be projected through the green portion, as was the case when it occupied the upper position. In this manner the right and left pictures will be projected through their respective color filters only. In this manner both eyes of the observer see at the same time their respective right and left hand views of substantially the same picture, and there is no strain upon either eye. Inasmuch as the superimposed pictures are robbed of green and red rays as they alternately pass through the red and green filters, and the pictures A and B are substantially a stereoscopic pair, a pleasing stereoscopic effect is produced when viewed through similar color filters.

It may be found desirable to arrange various instrumentalities by which right and left hand pictures may be projected through their respective lenses. In the standard film the pictures are of a distance between centers considerably less than the diameter of the ordinary lens used in the projection eye piece. For this reason we prefer to mount two lenses 5a and 5b in vertical relation, each being provided with a cut away portion 10, in order to allow their centers to coincide with the centers of the pictures before the film gate.

Another method of accomplishing this result is the provision of suitable prisms 11 on the screen side of the film gate to deflect the light rays projected therethrough into the lenses 5a and 5b. In this manner the lenses, no matter what their size, may be separated without having their sides cut away as previously.

Another method is the provision of a lens tube 12 in the path of each picture, being provided with prismatic lenses 13.

Another satisfactory method is the provision of two first surface reflectors 14 in the path of the projected pictures, each reflecting its picture to a second mirror 15 and from thence through the respective lenses 5a and 5b.

The color filter for the observer may conveniently take the form of eyeglasses or spectacles having a red and green filter or substantially these colors. When the pictures are viewed through such a filter, the picture projected through the red filter will be seen by the eye of the observer which is covered by the red glass or filter, the picture being invisible to the other eye and vice versa.

Obviously the shutter and revolvable color filter need not be one member and in some cases it will be found desirable to have these parts as separate elements.

A very satisfactory combination shutter and color filter has been found to consist of a disc of twice the size of the standard three blade shutter, and revolving at one half the speed, having six apertures therein separated by opaque portions. In each of these apertures is placed a red and a green filter at unequal radial distances from the center, three adjacent filter arrangement being similar, those opposite being the reverse. In this construction the opaque portions of the shutter, six in number form "flicker" and "cover" blades, two of the former being adjacent one of the latter. These blades operate in the usual manner of shutter blades.

It will be found desirable at times to change the "step" of the color filters in relation to the projected pictures, that is to reverse the color while running in order to adjust its relation to an improperly timed film. Such a device may consist of a collar 16 secured to the shutter shaft 7 which presses a spring 17 against a longitudinally movable clutch member 18 splined to the shaft 7 and provided with a peripheral recess 19. Lugs 20 projecting from diametrically opposite points of one face of the clutch 18 are adapted to seat in similar recesses 21 in the hub of the shutter disc carrying a color filter. The shutter is loose on shaft 7. A bell crank 22 pivoted to the machine as at 23 and having an arm 24 engaging the recess 19 in the clutch is provided to reciprocate this member upon the shaft 7. If while operating the projecting apparatus it is discovered that the colors show reversed in relation to the pictures, a sharp quick tap on the crank 22 throws the clutch momentarily out of engagement with the shutter which immediately lags in its rotation. The part 22 being released, the spring at once pushes the clutch back into engagement with the shutter hub at the first opportunity, which is 180° from its first position. This action reverses the colors with relation to the pictures. It is therefore possible to properly "frame" and color the pictures while being projected, the former by use of the usual "framing device" the latter by such a combination of parts above described.

We claim:

1. A method of producing a stereoscopic effect in moving pictures which includes the step of projecting through color screens successively photographed, horizontally differentiated, vertically adjacent stereoscopic pictures of black and white color values, from a film simultaneously on the same screen area, and viewing said pictures through color screens.

2. A method of producing stereoscopic effects in moving pictures which includes the step of projecting two successively photographed, horizontally differentiated, vertically adjacent stereoscopic pictures simultaneously on the same screen area, and then one of said pictures with a different picture simultaneously, and differentiating right and left hand pictures to the right and left eyes of the observer so that the right eye sees only the right hand picture, and vice versa.

3. A method of producing stereoscopic effects in moving pictures which includes the step of projecting a picture from a single width film strip carrying successively photographed, horizontally differentiated, vertically adjacent stereoscopic pictures, through two separate film gates at different times through color filters, and viewing the projected image through color filters.

4. A method of producing a stereoscopic effect in moving pictures, which includes the step of projecting horizontally differentiated, photographically sequential vertically adjacent stereoscopic pictures from a film strip simultaneously through color filters and viewing through color filters.

In testimony whereof, we affix our signatures.

GEORGE LANE.
JOHN E. PATTERSON.